US005332080A

United States Patent [19]

Lenhardt et al.

[11] Patent Number: 5,332,080

[45] Date of Patent: Jul. 26, 1994

[54] APPARATUS FOR CONVEYING INSULATING GLASS PANES

[75] Inventors: Karl Lenhardt, Neuhausen-Hamberg, Fed. Rep. of Germany; Rudolf Bernhardt, Bützberg, Switzerland

[73] Assignee: Lenhardt Maschinenbau GmbH, Neuhausen-Hamberg, Fed. Rep. of Germany

[21] Appl. No.: 30,072

[22] PCT Filed: Sep. 18, 1991

[86] PCT No.: PCT/EP91/01777

§ 371 Date: Mar. 19, 1993

§ 102(e) Date: Mar. 19, 1993

[87] PCT Pub. No.: WO92/05333

PCT Pub. Date: Apr. 2, 1992

[30] Foreign Application Priority Data

Sep. 19, 1990 [DE] Fed. Rep. of Germany ....... 4029669

[51] Int. Cl.[5] ....................... B65G 45/00; B65G 21/10

[52] U.S. Cl. .................................... 198/497; 198/817; 198/836.1; 198/861.1; 156/107; 156/109; 156/556

[58] Field of Search .................. 198/586, 803.14, 817, 198/822, 936.1, 836.3, 861.1, 496–498; 156/107, 109, 547, 556

[56] References Cited

U.S. PATENT DOCUMENTS

| | | | |
|---|---|---|---|
| 4,194,300 | 3/1980 | Swanson et al. | 198/822 |
| 4,231,464 | 11/1980 | Neilson | 198/822 |
| 4,422,541 | 12/1983 | Lisec | 198/836.1 |
| 4,911,779 | 3/1990 | Lenhardt et al. | 156/107 |
| 5,027,941 | 7/1991 | Lenhardt | 198/836.3 |

FOREIGN PATENT DOCUMENTS

| | | |
|---|---|---|
| 2311927 | 9/1974 | Fed. Rep. of Germany . |
| 2421623 | 10/1978 | Fed. Rep. of Germany . |
| 264896 | 2/1989 | Fed. Rep. of Germany . |
| 984759 | 11/1974 | Italy . |

*Primary Examiner*—Joseph E. Valenza

*Attorney, Agent, or Firm*—Dvorak and Traub

[57] ABSTRACT

The apparatus comprises a horizontal conveyor (2), which comprises an endless conveying element (5) having supporting surfaces (11, 12 ), on which the insulating glass panes (20) stand. Backing means (16) for the insulating glass panes (20) extend above the horizontal conveyor and define a plane of travel (34) for the panes. The horizontal conveyor (8) is displaceable in a direction which is at right angles to the direction of conveyance and parallel to that one supporting surface (11), which is adjacent to the plane of travel for the panes.

24 Claims, 6 Drawing Sheets

APPARATUS FOR CONVEYING INSULATING GLASS PANES

TECHNICAL FIELD

This invention relates to an apparatus for conveying insulating glass panes, comprising a horizontal conveyor, which on an endless conveying element has supporting surfaces, on which the insulating glass panes stand, and backing means, which extend above the horizontal conveyor and are parallel thereto and define a plane of travel for the panes by means of one or more backing elements, which are contacted by the insulating glass panes standing on the horizontal conveyor. Such an apparatus is known from German Utility Model 80 27 173.

Apparatuses in accordance with the invention are used in production lines for insulating glass in that region in which the semi-finished insulating glass pane is handled, which in most cases consists of two or three individual glass plates, which have been assembled together with one or two spacer frames, which has or have been coated on both sides with an adhesive composition. Such a semi-finished insulating glass pane has around its periphery an edge gap, which is filled with a sealing material, which is initially pasty and subsequently hardens and serves to establish a durable, strong bond between the individual glass planes which constitute the insulating glass pane and to seal the interior space of the insulating glass pane against an ingress of moisture. Thiocols and polyurethane are mainly used as sealing materials.

PRIOR ART

For the sealing of the edge gap of semi-finished insulating glass panes, the production lines comprise a sealing station, in which the insulating glass panes are sealed by means of one or more nozzles, which are moved along the edges of the panes (German Patent Specification 28 16 437). The apparatus in accordance with the invention is mainly intended for use in such a sealing station.

The apparatus known from German Utility Model 80 27 173 comprises a horizontal conveyor that comprises two endless chains, which are driven in synchronism and are parallel and carry pairs of oppositely disposed supports and pressure jaws. The insulating glass panes stand with their bottom edge on the supports, which extend only across a part of the insulating glass panes from their outside edge so that the edge gap remains free. The pressure jaws ensure that the insulating glass panes do not slip from the supports during the conveyance and that a slip does not occur. To permit a conveyance of insulating glass panes which differ in thickness, one of the conveying chains and the reversing sprocket wheels around which said chain is trained can be displaced at right angles so the direction of conveyance and to the axes of rotation of the reversing sprocket wheels.

To prevent a tilting of the insulating glass panes from the horizontal conveyor, backing means are provided above the horizontal conveyor and the insulating glass panes lean against said backing means. In the apparatus known from German Utility Model 80 27 173 a row of backing rollers are provided, which are adjustable in height and which support the insulating glass pane near its top edge.

The supports of the known apparatus extend to some extent under the insulating glass panes from its outer edge but leave free the edge gap. It is desired thus to prevent a taking up by the horizontal conveyor of some of the pasty sealing material which has been filled into the edge gap. But the sealing material may often cover also the bottom edge of the glass plates of which the insulating glass pane is composed and in that case the horizontal conveyor will take up some of the pasty sealing composition and will transfer part of that composition to succeeding insulating insulating glass panes. By means of the pressure jaws, sealing material which protrudes from the edge gap may even be transferred to the outside of the insulating glass panes. A further disadvantage of the known apparatus resides in that splinters may be detached from the bottom edge of the insulating glass panes because the insulating glass panes are clamped between the pressure jaws and particularly because the edges of the glass plates are not smooth but have been broken and for this reason have irregularities. A further disadvantage of the known apparatus resides in that a sealed insulating glass pane cannot be taken until the clamping effected by the pressure jaws has been eliminates by a transversel displacement of one conveyor chain; this involves the risk that the insulating glass pane may slip from the horizontal conveyor. The last-mentioned disadvantage is avoided by conveying apparatuses such as are described in German Patent Specification 28 16 437 and German Utility Model 89 05 421. Those apparatuses have a horizontal conveyor with supports which extend only locally under the insulating glass panes at their bottom edge but extend across the edge gap and take up more or less sealing composition from the edge gap so that an undesirable expenditure is involved in the cleaning of the supports. But it is difficult to clean the supports also in the horizontal conveyor which is known from German Utility Model 80 27 173, particularly because the L-shaped blocks, which are provided on the conveyor chains and constitute the supports, and the pressure jaws can be accessed only with difficulty.

The apparatus known from German Patent Specification 34 00 031 comprises supports only on one conveyor chain and differs from the apparatus known from German Utility Model 80 27 173 in that the risk of a soiling and or a detaching of splinters is reduced. But in that case too the insulating glass pane cannot be taken until its clamping has been eliminated.

Other known conveying apparatuses (German Patent Specification 28 46 785) comprise vacuum conveyors, which act on one of the broadside surfaces of the insulating glass panes and do not support said panes at their bottom edge. But in that case that glass plate of the insulating glass pane which is not directly held by the vacuum conveyor may slip off when that glass plate has been suspended from the vacuum conveyor for an excessively long time.

SUMMARY OF THE INVENTION

It is an object of the present invention to provide for conveying sealed insulating glass panes standing on edge an apparatus which just as the apparatuses known from German Utility Model 80 27 173 and German Patent Specification 34 00 031 leaves free the edge gap out is simpler in deign and in which the insulating glass panes are prevented from slipping off even during the transition from the conveyance to the lifting out operation.

That object is accomplished in surprisingly simple manner by an apparatus which has the features stated in claim 1. Desirable further features of the invention are the subject matters of the dependent claims.

The apparatus in accordance with the invention comprises for the conveyance of insulating glass panes a horizontal conveyor, which on an endless conveying element comprises supporting surfaces, which are aligned with two planes, which are parallel to the direction of conveyance and constitute an upwardly flaring wedge, the angle bisector of which is a plane which is parallel to the plane of travel for the panes. That horizontal conveyor is so arranged relative to the plane of travel for the panes, which plane is defined by the backing means, that the insulating glass pane to be conveyed is centrally disposed between the two planes which define the wedge. A difference from the apparatus known from German Utility Model 80 27 173 resides in that the supporting surfaces of the horizontal conveyor in accordance with the invention support the insulating glass pane only at the two outer edge lines of its bottom edge. As a result, virtually the entire bottom edge, not only its edge gap, remains free although the insulating glass panes are supported at their bottom edge. For this reason the risk that the supporting surfaces may take up sealing composition from the bottom edge of the insulating glass pane is much lower than in known conveying apparatuses in which the insulating glass panes are also supported at their bottom edge. Because the supporting surfaces define a wedge, the insulating glass panes tend to center themselves on the horizontal conveyor and this is highly desirable for the conveying operation. A special advantage of the new horizontal conveyor resides in that, different from the conveyor known from German Utility Model 80 27 173, there is no need for pressure jaws for clamping the insulating glass panes at their bottom edge and for preventing them from slipping from the horizontal conveyor; on the contrary: owing to the wedge-shaped arrangement of the supporting surfaces a slipping of the insulating glass panes from the supporting surfaces can inherently be precluded for a insulating glass panes of any thickness which may be expected; for that purpose it will be sufficient to make the spacing of the supporting surfaces adjacent to the vertex of the wedge defined by said surfaces so small that even the thinnest of the insulating glass panes which may be expected in practice cannot slip between the supporting surfaces. This can easily be achieved because the supporting surfaces extend down even to the vertex of the wedge and may even be formed on one and the same supporting member; a difference from the horizontal conveyor known from German Utility Model 80 27 173 resides in that it is by no means necessary that the spacing of the supporting surfaces is variable for an adaptation to insulating glass panes which differ in thickness. For this reason the horizontal conveyor in accordance with the invention may be much simpler in design and may require only a single endless conveying element, such as a chain or a belt, which carries all supports. For an adaptation to insulating glass panes which differ in thickness it is contemplated in accordance with the invention that the horizontal conveyor is displaced in a direction which is at right angles to the direction of conveyance and parallel to the surface of that supporting surface which is adjacent to the plane of travel of the pane. As a result, the distance from the vertex of the wedge to the plane of travel for the panes will be changed and that vertex will descend as it moves away from the plane of travel for the panes and will rise as it approaches the plane of travel for the panes. As a result, the level of the plane of conveyance on which the insulating glass panes stand at their bottom edge is the same for insulating glass panes of all thicknesses which may be expected; this is a requirement for the incorporation of the apparatus in accordance with the invention in a production line for making insulating glass. The drive for the transverse displacement of the horizontal conveyor can be controlled by an automatically operating measuring device, which measures the thickness of each insulating glass pane before it enters the apparatus in accordance with the invention. Alternatively, the transverse displacement can be controlled in accordance with a pregiven working program, in which the kinds and dimensions of the consecutive insulating glass panes are stored.

A further advantage of the horizontal conveyor in accordance with the invention resides in that it can be used with good success not only with insulating glass panes in which the sealing composition forms a concave surface in the edge gap out also with such insulating glass panes in which the sealing composition forms a planar surface, which is flush with the bottom edge of the glass plates, or even a protruding convex surface, because the supporting surfaces do not extend under the insulating glass panes but support them only at their outer edge lines. Because the tendency of the supporting surfaces to take up sealing composition is strongly reduced, the expenditure involved in the cleaning of the horizontal conveyor is also strongly reduced and, besides, that cleaning can be carried out more easily because it is now necessary to clean only supporting surfaces rather than also pressure jaws which protrude over such supporting surfaces. The elimination of the pressure jaws affords three further essential advantages: In the first place, any sealing composition which has been taken up by the horizontal conveyor can no longer be transferred to the side faces of the insulating glass panes. In the second place, the insulating glass pane can readily be taken from the horizontal conveyor at any time; this is a particularly great relief. (In the horizontal conveyor known from German Utility Model 80 27 173 it was necessary first to eliminate the clamping and this involves the risk of a slipping down of the insulating glass pane.) In the third place, the risk of a detaching of splinters gas has been reduced although the insulating glass panes are now supported only at their outer edge lines. In this connection it is favorable that the supports can be arranged, on principle, in any desired dense sequence axed it is even possible to use as supports two endless belts, which move in synchronism and form a wedge-shaped arrangement and owing to their continuous supporting surface can be cleaned particularly easily.

The backing means for the insulating glass panes may be designed as is known in the art.

A vertical row of backing rollers, which are adjustable in height, may be used, and their elevation is so adjusted from case to case that the insulating glass panes lean only at their top edge against said row of backing rollers; such backing means are known from German Utility Model 80 27 173. It is also possible to use as backing means an air cushion wall. Which for that purpose is known from German Patent Specifications 28 16 426 and 34 00 031. Finally, the backing means may be constituted by a field of backing rollers having vertical axes of rotation (German Patent Specification 28 16 437).

The insulating glass panes are usually not conveyed it, an exactly vertical orientation but are leaned against the backing means through a few degrees from the vertical so that the panes cannot fall out of the apparatus. For the insulating glass panes standing on the horizontal conveyor the front side of the cackling means defines a plane of travel for the panes. In this case the pane of travel for the panes is that plane in which the surface of the insulating glass pane that faces the cackling means is disposed during the conveyance.

The supporting surfaces of the horizontal conveyor which are arranged in wedge shape desirably face each other although this is not essential because they might be provided in alternation on the front side and on the rear side of the horizontal conveyor.

The following remarks are applicable to the included angle of the wedge that is defined by the supporting surfaces: The smaller that angle the larger will be the free space between the bottom edge of the insulating glass pane and the supporting surfaces and there will be a correspondingly small risk that protruding sealing composition may soil the supporting surfaces. On the other hand, the smaller the angle the lower will be the accuracy with which the elevation of the bottom edge of the insulating glass pane is defined in the wedge-shaped space between the supporting surfaces. The larger the included angle of the wedge the more definitely will the elevation of the bottom of the insulating glass pane be determined and the smaller will be the distance from the supporting surfaces to the sealing composition disposed in the edge gap of the insulating glass pane. The included angle of the wedge is preferably between 100° and 140° and most preferably amounts to about 120°. To provide even in conjunction with a large included angle of the wedge a large free space under the sealing composition disposed in the edge gap of the insulating glass pane being conveyed, the supporting surfaces desirably do not extend as far as to the apex of the wedge that is defined by them out terminate at a distance from one another which is just sufficient for the conveyance of the thinnest of the insulating glass panes which are expected to be conveyed and a recess or gap is provided in the remaining space.

Because it is an object to convey insulating glass panes, the supporting surfaces on which the insulating glass panes stand at their outer edge lines are made of a material which is sufficiently cut-resistant and preferably consists of a plastic or elastomer which is not excessively hard and has a Shore A hardness between 15° and 50°, preferably between 30° and 40°, and a coefficient of friction which is as high as possible so that the insulating glass panes standing on said supporting surfaces can be conveyed gently and without slipping. Examples of suitable materials are natural rubbers, polyurethane and polyvinylchloride, particularly a foamed polyurethane having a Shore A hardness of about 40°. Said materials are preferably provided on a harder carrier in a layer which has a thickness not in excess of 2 mm so that supports which are sufficiently stable in shape are provided for the insulating glass panes.

If the supporting surfaces are constituted by the surfaces of two endless belts, which are driven in synchronism and in accordance with the invention are arranged in wedge shape, said belts will desirably be supported by surfaces which are correspondingly arranged in the shape of a wedge and provided on a carrier which extends in the direction of conveyance and which for an adaptation to insulating glass panes which differ in thickness is displaceable transversely to the direction of conveyance. To permit the belts to be driven without a slip, they preferably consist of toothed belts, particularly of such belts which on their front side consist of a cut-resistant plastic or elastomer that has a high coefficient of friction and on their rear side consist of a plastic which has a relatively lower coefficient of friction, such as polyamide. If it is found that the friction between the belts and the surfaces by which said belts are supported on the carrier is excessively high, particularly in the handling of heavy insulating glass panes, the means for supporting the belts may be constituted by two rows of rollers, which have axes defining a corresponding wedge and are movably mounted on or in a carrier which extends in the direction of conveyance.

Instead of providing two belts arranged in wedge shape and serving to convey the insulating glass panes, it is sufficient to provide a single endless conveying element, particularly a conveying chain, which carries a sequence of supports, on which the supporting surfaces are formed in a wedge-shaped arrangement. Said supports preferably consis at least adjacent to the supporting surfaces of a cut-resistant plastic so that a gentle transportation of the insulating glass panes will be ensured. Cut-resistant plastics have already been used in apparatuses for conveying glass panes, which apparatuses are known in the art, and such plastics are known to those skilled in the art. They include, e.g., cut-resistant polyurethane elastomers (trade name VULKOLIAN) or polyamides.

Because the spacing of the supporting surfaces provided on the single conveying element may be invariable, the conveying element preferably carries integral supports, which are provided with supporting surfaces which have the two inclinations concerned and in the simplest case said supports consist of small blocks which have a wedge-shaped groove. Such a horizontal conveyor has an extremely simple design.

There is no need for an expensive mechanism for the transverse displacement of the horizontal conveyor. It is sufficient, e.g., to provide the conveying element on a carrier, which extends in the direction of conveyance and is movably mounted on or in at least two spaced apart tracks, which are provided on the frame of the apparatus and extend at a corresponding angle of inclination relative to the plane of travel for the panes and are parallel to that supporting surface which is adjacent to the plane of travel for the panes.

Ways of Carrying Out the Invention

Illustrative embodiments of the invention are shown in the accompanying schematic drawings.

FIG. 5 shows an apparatus as shown in FIG. 3 with a further improvement consisting of cleaning means.

In the various illustrative embodiments, like and corresponding parts are designated by the same reference numerals.

Figure 1:
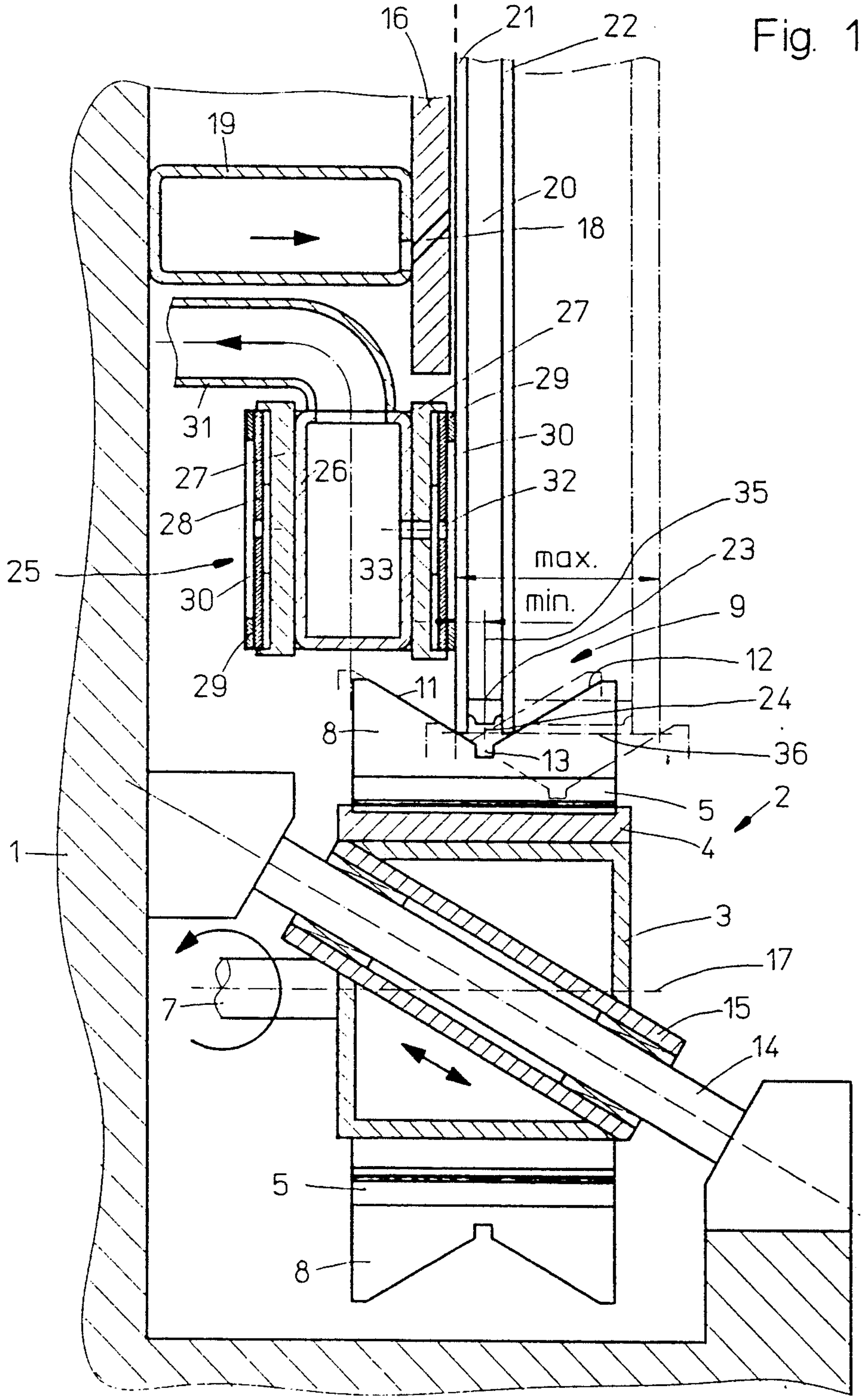
FIG. 1 is a sectional view taken on a line which extends at right angles to the direction of conveyance and shows an apparatus for conveying insulating glass panes, which apparatus comprises an air cushion wall for laterally backing the insulating glass panes.
Figure 3:
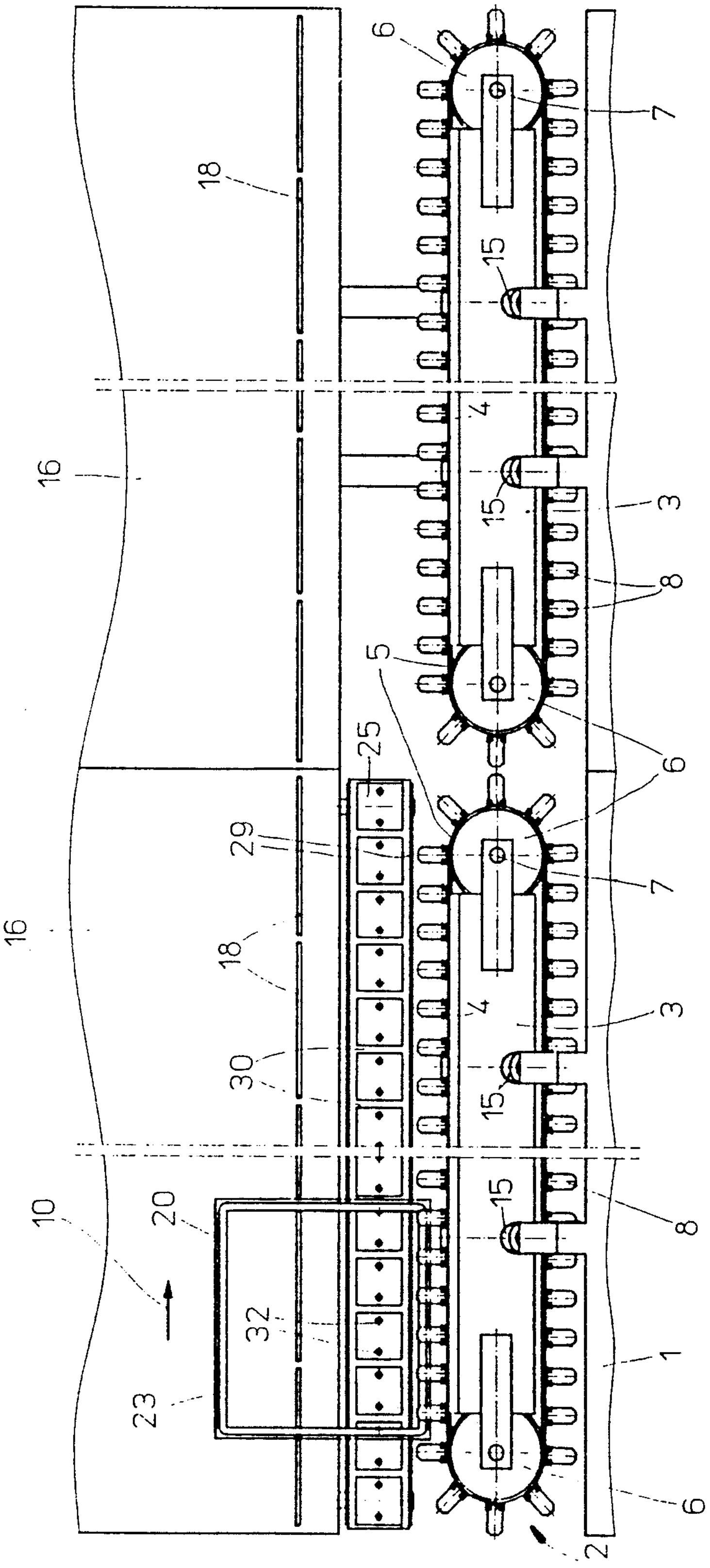

The apparatus shown in FIGS. 1 and 3 comprises a frame 1, on which a horizontal conveyor 2 is mounted. The horizontal conveyor comprises a carrier 3, which extends in the direct ion of conveyance 10, and a horizontal track rail 4, which is secured to the top of the carrier 3 and in which an endless belt 5 extends, which is trained around reversing pulleys 6, which are mounted at the ends of the carrier 3 and one of which is driven. The shaft 7 for driving the driven reversing pulley is indicated in FIG. 1.

The belt 5 carries regularly spaced apart supports 8 made of a cut-resistant plastic. The supports consist of clocks, which are formed in their top surface with a wedge-shaped groove 9, which extends in the direction of conveyance 10 and is defined by two rows of planar supporting surfaces 11 and 12, which are aligned with each other. The vertex at which the supporting surfaces 11 and 12 meet has been omitted and replaced by a recess 13.

To permit a displacement of the horizontal conveyor 2 transversely to the direction of conveyance 10, the carrier 3 is displaceably mounted on two guide rods 14, which extend at right angles to the direction of conveyance 10 and are parallel to the supporting surface 11 so that they have the same inclination as the supporting surface 11. The guide rods 14 extend through two guide bushings 15, which have been welded into the carrier 3.

An air cushion wall 16 is mounted on the frame 1 above the horizontal conveyor 2 and extends parallel to the direction of conveyance and is inclined from the vertical to the rear by a few degrees. The axes 17 of the reversing pulleys extend at right angles to the air cushion wall 16; this is also true for the top surface of the track rail 4. The air cushion wall 16 has slots 18, which face in an upwardly inclined direction and are supplied with air from a fan, not shown, through a hollow beam 19, by which the air cushion wall 16 is secured to the frame 1. That air rises on the front surface of the air cushion wall and forms an air cushion between the air cushion wall and an insulating glass pane 20 standing on the horizontal conveyor 2. The insulating glass pane 20 consists of two individual glass plates 21 and 22, which are adhesively joined by means of a spacer 23, the periphery of which is somewhat smaller than that of the insulating glass pane so that an edge gap 24 remains, which extends from the outside surface of the spacer to the edges of the glass plates 21 and 22 and is filled with a pasty sealing composition.

The illustrative embodiment shown in FIG. 3 comprises two horizontal conveyors and two air cushion walls, which are arranged one behind the other in the direction of conveyance 10. In the first section of the conveying apparatus an auxiliary conveyor 25 is provided between the horizontal conveyor 2 and the air cushion wall 16 and consists of a vacuum conveyor belt, which acts on that surface of the insulating glass pane 20 that faces the air cushion wall and which sucks said pane. The auxiliary conveyor 25 is driven in synchronism with the horizontal conveyor 2 and is intended to ensure that there will be no slip between the insulating glass pane 20 and the horizontal conveyor 2. An auxiliary conveyor consisting of a vacuum conveyor is also known in conjunction with the conveyor known from German Utility Model 80 27 173 (see German Utility Model 83 18 401).

The illustrated auxiliary conveyor consists of a hollow beam 26, which extends parallel to the direction of conveyance 10 and on each of its front and rear sides carries a track rail 27, in which a belt 28 extends, which on its front side is formed with longitudinally extending striplike elevations 27 and with webs 30, which extend from top to bottom and connect said elevations, so that shallow open chambers are provided, which can be covered by an insulating glass pane 20. Through holes 32 and 33 in the belt 28 and in the beam 26, respectively, said shallow chambers communicate with the interior of the beam 26 and that interior communicates via a suction pipe 31 with the suction side of a fan so that a vacuum is generated in the space between the belt 28 and the insulating glass pane 20. Other vacuum conveyor belts which can be used for the present purpose are described in published German Application 35 29 892 and in European Patent Specification 0 225 429.

The forward surface of the auxiliary conveyor 25 and of the air cushion wall 16 by which the insulating glass pane 20 is laterally supported, a plane of travel 34 for the panes is defined, which is disposed over the supporting surface 11. The other supporting surface 12 extends in front of the pane of travel for the panes. That plane 35 which bisects the angle included by the supporting surfaces 11 and 12, which are arranged in wedge shape, extends parallel to the plane of travel 34 for the panes and as regards its distance from the plane of travel for the panes is so arranged that said plane extends at the center of the insulating glass pane 20. As a result, the level 36 of the bottom edge of insulating glass panes which differ in thickness will always be the same on the supports 8. The range through which the horizontal conveyor 2 is adjustable for an adaptation to insulating glass panes 20 which differ in thickness is indicated by dotted lines in FIG. 1.

Figure 2:
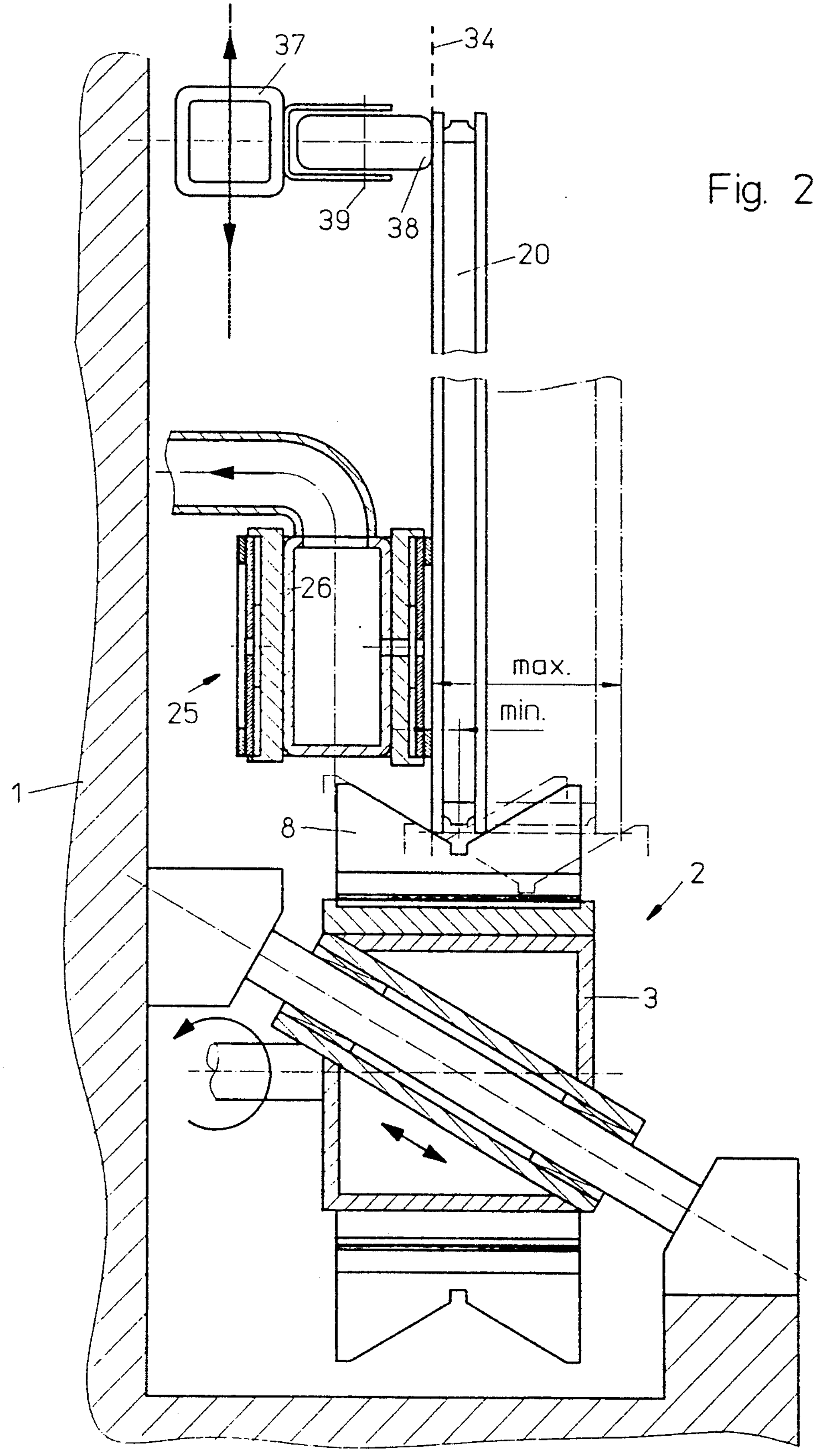
FIG. 2 is a view that is similar to FIG. 1 and shows a modified apparatus comprising a row of vertically adjustable backing rollers rather than an air cushion wall.

The apparatus shown in FIG. 2 differs from the one shown in FIG. 3 only in that the means for backing the insulating glass panes 20 consist of a lifting beam 37, which is parallel to the direction of conveyance, rather than of an air cushion wall. The lifting beam 37 carries on its front side a row of freely rotatable rollers 38 having axes 39 which are parallel to the plane of travel 34 for the panes. The elevation of the lifting beam 37 is so adjusted that the rollers 38 support the insulating glass pane 20 close to its top edge. The lifting beam 37 is adjusted in known manner by a motor, which is controlled by a sensor, which detects the height of each insulating glass pane before it enters the apparatus.

Figure 4:
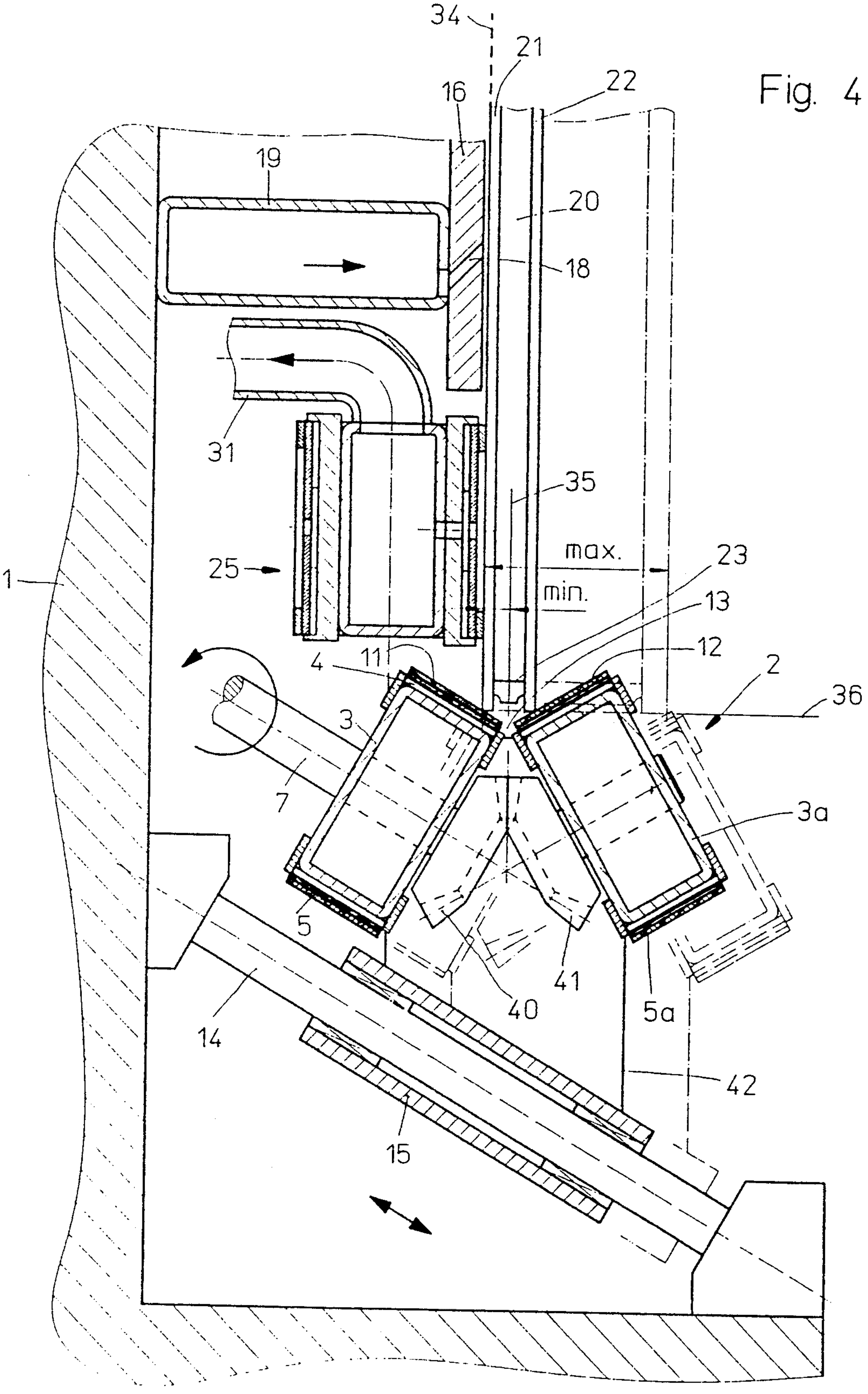
FIG. 4 is a view that is similar to FIG. 1 and shows a further illustrative embodiment of an apparatus for conveying insulating glass panes. In that apparatus the horizontal conveyor comprises two endless belts arranged in wedge shape rather than an endless belt provided with supports.

The illustrative embodiment shown in FIG. 4 differs from the illustrative embodiment shown in FIG. 1 as regards its horizontal conveyor 2, which in the present case comprises two carriers 3 and 3*a*, which extend in the direction of conveyance and consist of hollow beams, which are rectangular in cross-section and are so inclined that their top surface determine the angle which is included by the supporting surfaces 11 and 12, which are arranged in wedge shape. In an arrangement which is similar to that of the first illustrative embodiment, endless belts 5 and 5*a* extend on the two carriers 3 and 3*a* but they do not carry supports but in themselves serve directly as supports for the insulating glass panes 20.

The two belts 5 and 5a run in synchronism. For that purpose their driven reversing pulleys are interconnected by helical gears 40 and 41. The two carriers 3 and 3a are rigidly connected by checks 42 to guide bushings 15, which as in the first illustrative embodiment are displaceable on guide rods 14 to permit an adaptation of the conveyor to insulating glass panes 20 which differ in thickness.

The two belts 5 and 5a consist of toothed belts, the forward surface of which constitutes the supporting surfaces 11 and 12 and consists of a cut-resistant material that has a high coefficient of friction, particularly of a foamed polyurethane elastomer having a Shore A hardness of about 40°. The toothed rear surface of said belts consists of a plastic which is relatively harder and has a lower friction than the material of the forward surface and particularly consists of a polyamide.

In both illustrative embodiments the supporting surfaces can be cleaned to remove any sealing composition which has been transferred. For the apparatus shown in FIG. 1 this is shown, e.g., in FIG. 5. A rotating cleaning brush 43 is mounted on the frame 1 under the lower course of the belt 5 and acts on the supports 8. The cleaning brush may be immersed in a container that contains a cleaning liquid. In addition, a scraper 44 may be provided, which wipes over the supporting surfaces of the supports 8 passing by.

Figure 5:
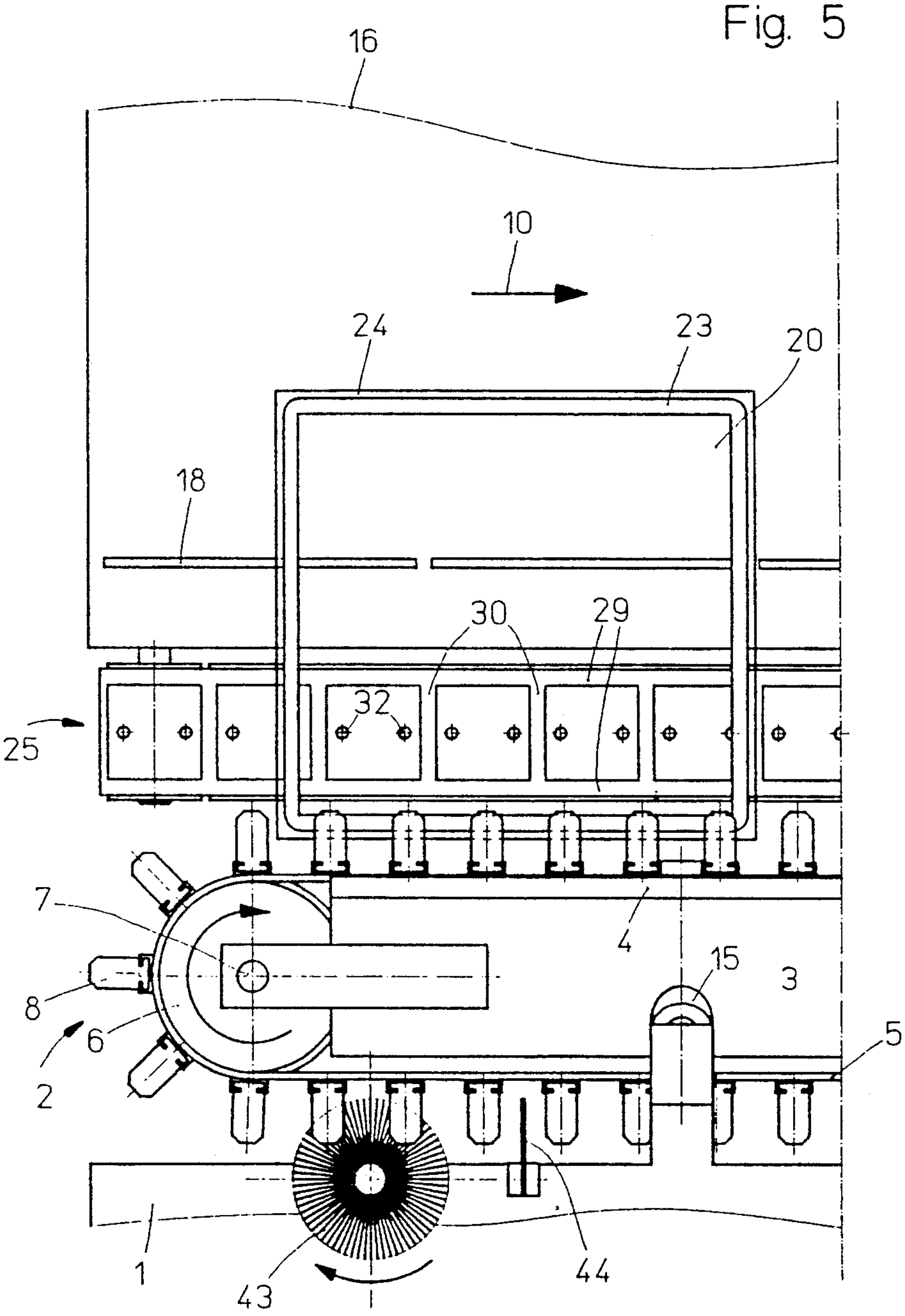
FIG. 5 is a front elevation showing the same apparatus as FIG. 1.

The cleaning of an apparatus of the kind shown in FIG. 5 is particularly simple. As is shown in FIG. 6, a smooth belt 5 can be particularly easily cleaned by a rotating cleaning brush 43 and/or a scraper 44.

Figure 6:
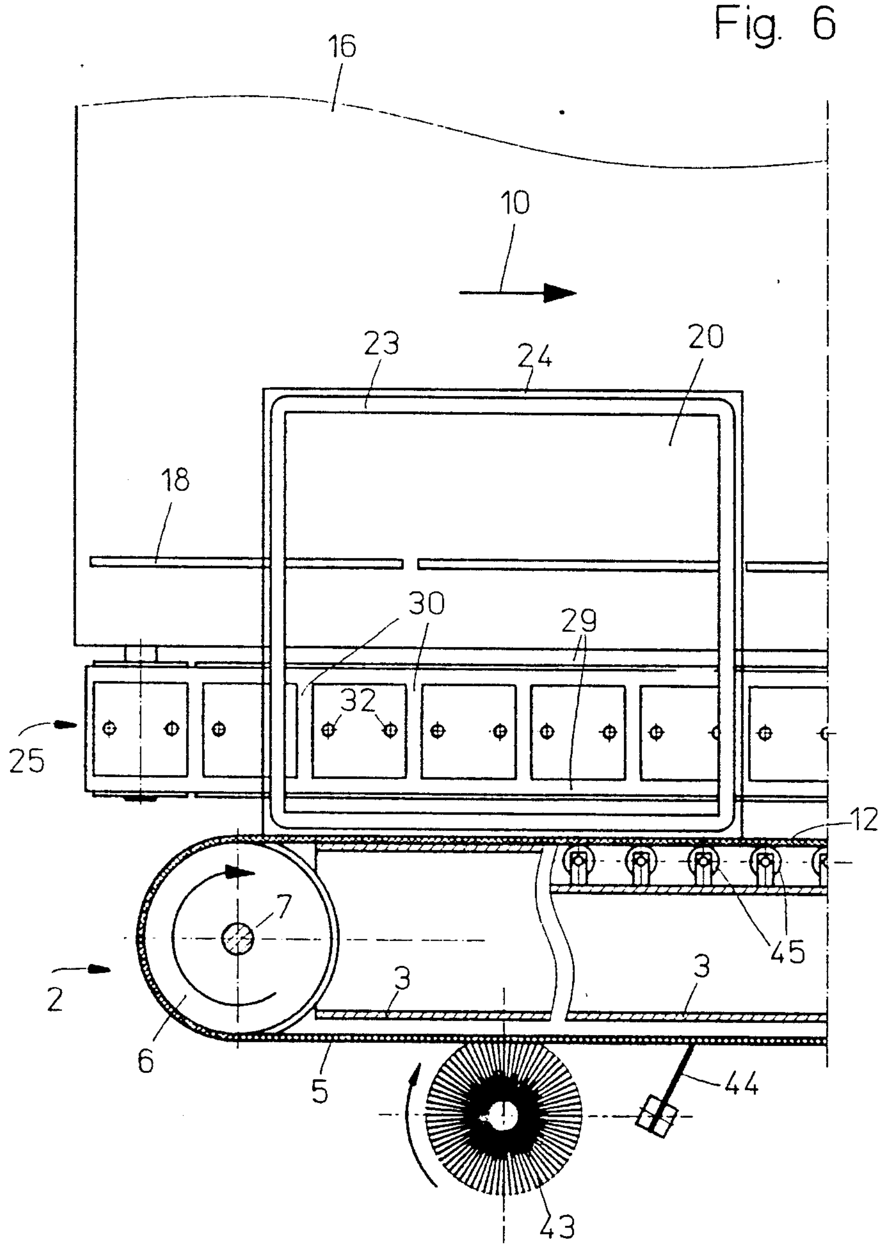
FIG. 6 shows an apparatus as shown in FIG. 4 with a further improvement consisting of cleaning means.

In addition, an alternative embodiment of the horizontal conveyor is shown in the right-hand half of FIG. 6. In that embodiment the belt 5 does not slide over the carrier 3 but slides over a row of backing rollers 45, which are mounted on the carrier, so that the friction of the belt 5 can considerably be reduced.

INDUSTRIAL UTILITY

Apparatuses in accordance with the invention are used in production lines for making insulating glass.

What is claimed is:

1. An apparatus for conveying insulating glass panes comprising a horizontal conveyor (2), which defines a horizontal direction of conveyance comprises an endless conveying element (5) having supporting surfaces (11, 12), on which the insulating glass panes (20) stand, and backing means (16, 38), which extend above the horizontal conveyor (2) and are parallel thereto and by means of one or more backing elements, which are contacted by the insulating glass panes (20) standing on the horizontal conveyor (2), define a plane of travel (34) for the panes, wherein said supporting surfaces (11, 12) are aligned with two planes, which are parallel to said direction of conveyance (10) and define an upwardly flaring wedge, the angle bisector (35) of which is a plane that is parallel to said plane of travel (34) for the panes, and wherein said horizontal conveyor (8) is displaceable in a direction which is at right angles to said direction of conveyance (10) and parallel to the surface of that supporting surface (11) which is adjacent to said plane of travel (34) for the panes.

2. An apparatus according to claim 1, characterized in that the included angle of the wedge is 100° to 140°.

3. An apparatus according to claim 1, characterized in that the included angle of the wedge is 120°.

4. An apparatus according to claim 1, characterized in that the supporting surfaces (11, 12) consist of a cut-resistant plastic or elastomeric material having a Shore A hardness between 15° and 50°, preferably between 30° and 60°.

5. An apparatus according to claim 4, characterized in that the material for the supporting surfaces (11, 12) is a natural rubber, a polyurethane or a polyvinylchloride.

6. An apparatus according to claim 5, characterized in that the material for the supporting surfaces (10, 11) is a foamed polyurethane.

7. An apparatus according to claim 1, characterized in that the supporting surfaces (10, 11) are constituted by the surfaces of two endless belts (5, 5a), which are driven in synchronism.

8. An apparatus according to claim 7, characterized in that the belts (5, 5a) are toothed belts.

9. An apparatus according to claim 7, characterized in that the belts (5, 5a) consist on their front side of a cut-resistant plastic or elastomeric material having a high coefficient of friction and consist on their rear side of a plastic having a relatively lower coefficient of friction.

10. An apparatus according to claim 4, characterized in that the cut-resistant material used for the supporting sum-faces (11, 12) is provided as a layer having a thickness of up to 2 mm.

11. An apparatus according to claim 7, characterized in that the belts (5, 5a) are supported by surfaces cf a carrier (5, 5a), which extends in the direction of conveyance (10), said surfaces being correspondingly arranged in wedge shape.

12. An apparatus according to claim 7, characterized in that the belts (5, 5a) are supported by two rows of rollers (45), the axes of which are correspondingly arranged in wedge shape.

13. An apparatus according to claim 1, characterized in that the conveying element carries supports (8), which are formed with the supporting surfaces (11, 12).

14. An apparatus according to claim 13, characterized in that the supports (8) consist of a cut-resistant plastic at least adjacent to the supporting surfaces (11, 12).

15. An apparatus according to claim 1, characterized in that the spacing of the supporting surfaces (11, 12) is invariable.

16. An apparatus according to claims 13 and 15, characterized in that the supports (8) have a wedge-shaped indentation (9).

17. An apparatus according to claim 1 comprising a frame (1) and a carrier (3), said carrier extending and carrying said conveying element (5) in the direction of conveyance (10) movably mounted on the frame (1) of the apparatus on or in at least two spaced apart tracks (14), which are parallel to that supporting surface (11) which is adjacent to the plane of travel (54) for the panes.

18. An apparatus according to claim 1, characterized in that a recess (13) or gap is provided instead of the vertex between the supporting surfaces (11, 12) arranged in wedge shape.

19. An apparatus according to claim 1, characterized in that cleaning means (45, 44) acting on the supporting surfaces (11, 12) are provided and face the lower course of the conveying element (5).

20. An apparatus according to claim 19, characterized in that the cleaning means (43, 44) comprise a scraper (44), which acts oil the supporting surfaces (11, 12).

21. An apparatus according to claim 7, characterized in that said cleaning means comprises a scraper acting on said supporting surfaces.

22. An apparatus according to claim 19, characterized in that said cleaning means comprises a scraper acting on said supporting surfaces.

23. An apparatus according to claim 9, wherein said cut-resistant material used for said supporting surfaces is provided as a layer having a thickness of up to 2 mm.

24. An apparatus according to claim 1 characterized in that said backing means comprises a rotatable roller.

* * * * *